C. E. BROWN.
SPOKE SOCKET.
APPLICATION FILED JUNE 1, 1909.
956,035.
Patented Apr. 26, 1910.
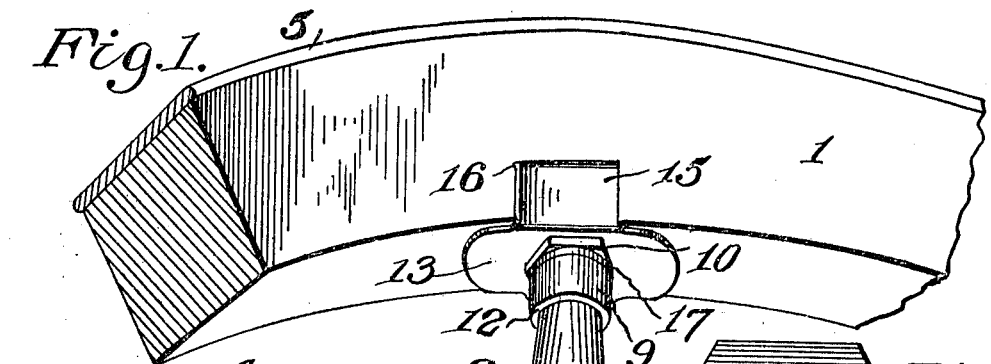
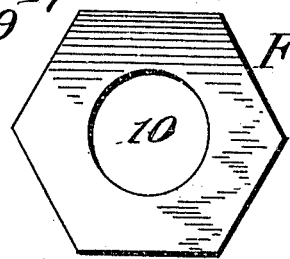
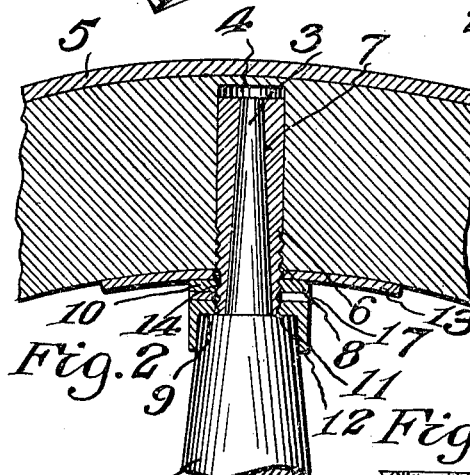
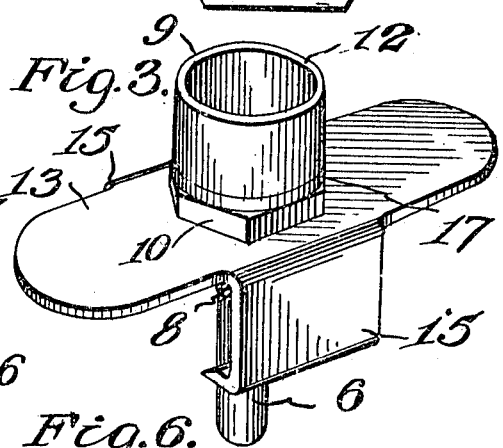
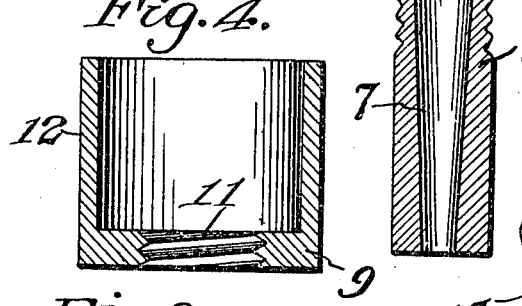
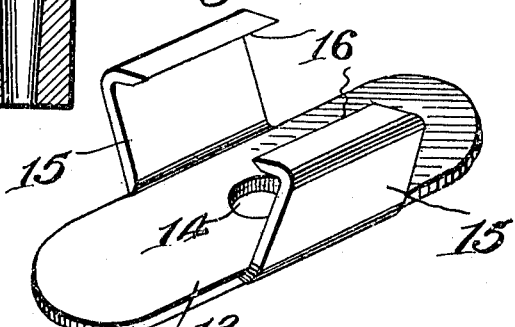
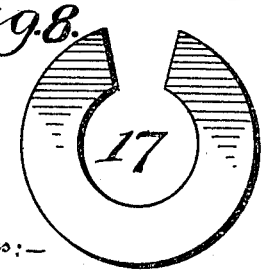
Witnesses:—
Joe. P. Wahler.
E. M. Ricketts.
Inventor
Charles E. Brown
By Watson E. Coleman
Attorney

UNITED STATES PATENT OFFICE.

CHARLES E. BROWN, OF DANVILLE, ILLINOIS.

SPOKE-SOCKET.

956,035.  Specification of Letters Patent.  Patented Apr. 26, 1910.

Application filed June 1, 1909. Serial No. 499,286.

*To all whom it may concern:*

Be it known that I, CHARLES E. BROWN, a citizen of the United States, residing at Danville, in the county of Vermilion and State of Illinois, have invented certain new and useful Improvements in Spoke-Sockets, of which the following is a specification, reference being had to the accompanying drawings.

This invention relates to improvements in adjustable spoke sockets whereby the spokes and rim of a wheel may be quickly tightened to take up wear and true the wheel and whereby broken spokes may be quickly repaired.

The object of the invention is to provide a simple and inexpensive adjustable metallic spoke socket which may be readily applied to new or old wheels, which may be quickly and easily adjusted to take up wear and hold the parts rigidly in proper position so that the wheel will run true, and which may be readily applied to a broken spoke to completely repair the same.

With the above and other objects in view, the invention consists of the novel features of construction and the combination and arrangement of parts hereinafter fully described and claimed, and illustrated in the accompanying drawings, in which—

Figure 1 is a perspective view of a portion of a wheel showing the application of the invention; Fig. 2 is a longitudinal section of the part shown in Fig. 1; Fig. 3 is a perspective view showing several parts of the invention assembled ready for application to a wheel; and Figs. 4, 5, 6, 7 and 8 are detail views of the several parts of the device.

In the drawings 1 denotes a portion of the felly or rim of a wheel of a buggy, wagon, or other vehicle and 2 denotes one of the spokes having at its outer end a reduced and tapered portion or tenon 3 to enter the socket 4 in the rim.

5 denotes the usual tire covering the outer surface of the rim or felly.

My improved metallic socket comprises a tubular shaft or sleeve 6 which is rotatably arranged in the socket 4 of the rim and which has a longitudinally tapered bore or socket 7 for the reception of the tenon 3 of the spoke. The taper of the tenon 3 is the same as that of the socket 7 so that the tubular shaft or sleeve 6 will have a firm bearing throughout the length of the tenon. This construction materially aids in tightening the spoke and maintaining it in rigid condition as well as greatly strengthening the device. The projecting outer end of the sleeve 6 is externally screw-threaded as at 8 for the reception of a spoke projecting cap 9 and an adjusting nut 10. Said protecting cap 9 has a thickened portion formed with a centrally arranged screw-threaded opening 11 to engage the screw-threads 8 and surrounding said thickened body portion is an annular flange 12 which receives the spoke 2. Said body portion of the protecting cap 9 rests upon the shoulder formed by reducing the end of the spoke to provide the tapered tenon 3 so that an effective bearing is secured to greatly strengthen the outer end of the spoke. Said protecting cap 9 is adjustable on the sleeve so that when the tenon and shoulder of the spoke wear the parts 6, 9 may be adjusted inwardly or downwardly on the spoke to cause them to have an effective bearing.

As above explained, the uniform and similar taper of the exterior of the tenon 3 and the bore or opening in the sleeve 6 together with the bearing of the cap 9 upon the shoulder on the spoke causes the connection to be exceedingly strong and substantial and greatly aids in making the spoke tight in taking up wear when the device is adjusted. The nut 10 when screwed outwardly on the sleeve or shaft 6 forces the rim 1 and spoke 2 away from each other to tighten said parts and in order to prevent wear on the rim 1 and also to strengthen and reinforce the latter so that it will not split, I provide a reinforcing and wear plate 13. Said plate 13 has an elongated body portion to bear against the inner face of the rim 1 and is formed in its center with an opening 14 to receive the sleeve 6, a nut 10 being adapted to bear against the outer face of the elongated body of the plate 13 and thereby prevent wear of the rim 1.

Formed integral with and projecting from the opposite side edges of the plate 13 are reinforcing arms 15 which engage the side faces of the rim 1 and may be suitably fastened thereto.

If desired, inwardly projecting fastening spurs or blades 16 may be formed by bending the extremities of the arms 15 and these spurs or blades may be driven into the opposite sides of the rim to fasten the member 13 thereto.

When the nut 10 is adjusted outwardly on the sleeve 6 a space is left between said nut and the protecting cap 9, and such space is adapted to be filled by open washers or fill-up plates 17 shown more clearly in Fig. 8 of the drawings. Any number of these fill-up plates or washers may be employed and their use will effectively strengthen the connection and relieve the sleeve 6 and tenon 3 from undue strain. When said fill-up plates 17 are used it will be seen that they will tend to lock the nut 10 and prevent the latter from working inwardly and loosening the parts.

In using the invention, the parts are assembled by inserting the metal sleeve or socket 6 in the socket 4 of the rim 1, then applying the wear plate or member 13 to the sleeve and rim, then applying the nut 10 and spoke protecting cap 9 and finally inserting the spoke and its tenon in the parts 9, 6.

By constructing the different parts of the tightening and repair device of substantial metal and as set forth, the rim, the spokes and the other portions of the wheel are protected from damaging wear and tear because by means of the device all of the joints of the wheel may be kept tight and rigid. A wheel equipped with the invention may be, therefore, easily kept in perfect repair and protected from the injurious effect of the weather. The wheel may be thus kept by one unskilled in vehicle construction because the device is simple in construction and easy to manipulate. Its simple construction also renders it comparatively inexpensive and brings it within reach of all owners of buggies, wagons, and other vehicles. Should one of the tenons of a spoke of an ordinary wheel break the device may be readily applied to the broken spoke to supply the tenon and effectively repair the wheel.

As above observed, the device may be applied to new wheels in the course of manufacture or to old or damaged wheels.

While I have shown and described the preferred embodiment of the invention it will be understood that I do not wish to be limited to the precise construction set forth, since various changes in the form, proportion, and arrangement of parts and in the details of construction may be resorted to within the spirit and scope of the invention.

Having thus described the invention, what is claimed is:

The combination with a rim having a socket and a spoke having a reduced end or tenon, of a sleeve arranged on the spoke tenon and in said socket in the rim, the projecting end of said sleeve being screw-threaded, a flanged spoke protecting cap arranged on the threaded end of the sleeve and on the spoke, a combined wear plate and reinforcing member arranged on the inner face of the rim and apertured to receive said sleeve, said member having projecting arms to engage the opposite sides of the rim, and spurs upon said arms to enter the rim, and an adjusting nut arranged on the threaded portion of the stem and adapted to engage said wear plate.

In testimony whereof I hereunto affix my signature in the presence of two witnesses.

CHARLES E. BROWN.

Witnesses:
W. M. ACTON,
C. E. WEBSTER.